June 7, 1955 R. L. STEPHENS 2,710,345

RADIO LINK SOUND PICKUP

Original Filed Dec. 21, 1951 2 Sheets-Sheet 1

ROBERT LEE STEPHENS,
INVENTOR.

BY W E Beatty

ATTORNEY.

RADIO LINK SOUND PICKUP

Original Filed Dec. 21, 1951 2 Sheets-Sheet 2

ROBERT LEE STEPHENS,
INVENTOR.

BY W. E. Beatty
ATTORNEY.

United States Patent Office 2,710,345
Patented June 7, 1955

2,710,345

RADIO LINK SOUND PICKUP

Robert Lee Stephens, Los Angeles, Calif.

Original application December 21, 1951, Serial No. 262,824. Divided and this application August 5, 1952, Serial No. 302,723

7 Claims. (Cl. 250—17)

The invention relates to a radio link sound pickup and more particularly to avoiding the use of a cable between a microphone and its audio output circuit, while also avoiding the use of any special support for the microphone.

The present invention is accomplished by concealing a miniature radio transmitter and its microphone in the clothing of the actor or speaker and by providing an associated radio receiver therefor off stage, the receiver having an audio output circuit which is applied to the speech input system of any other audio equipment, thereby providing a radio link between the microphone and the audio output circuit.

As applied to use with a television camera for a live broadcast or a motion picture camera for photographing and recording motion pictures and sound, the invention avoids the usual microphone boom. In such case, the actor has greater freedom of movement as he can walk through a doorway where a microphone boom could not follow him and greater freedom in lighting the set is provided as there is no possibility that the microphone boom may cast its shadow in the field of view of the camera.

As applied to radio broadcasts, the invention has the advantage that the master of ceremony has greater freedom of movement, particularly for audience participation shows and in such case the microphone being concealed is not apt to produce "mike fright."

In the case of public address systems, the invention has the advantage of greater freedom of movement of the speaker while leaving both hands free, for writing on a blackboard or otherwise, and for holding and displaying various objects.

An object of the invention is to provide a miniature radio transmitter of low power which in conjunction with a suitable radio receiver will provide sound current of high fidelity and meet the current requirements for talking motion pictures and television broadcasts.

A further object of the invention is to provide a miniature radio transmitter having a small number of parts. This is accomplished by providing one sub-miniature pentode for frequency modulation, another similar pentode for doubling the output of the oscillator tube and by providing a miniature condenser microphone which is directly connected to the tank circuit of the oscillator tube; also by providing one high frequency by-pass condenser which serves both tubes; and by grounding the B+ side of the plate circuit of both tubes whereby the antenna and the microphone element can be maintained at D. C. ground potential and the screen grids of the tubes and the low radio frequency side of the tank coils of both tubes can be directly connected to the transmitter frame or casing.

For further details of the invention reference may be made to the drawings wherein.

Figure 3:
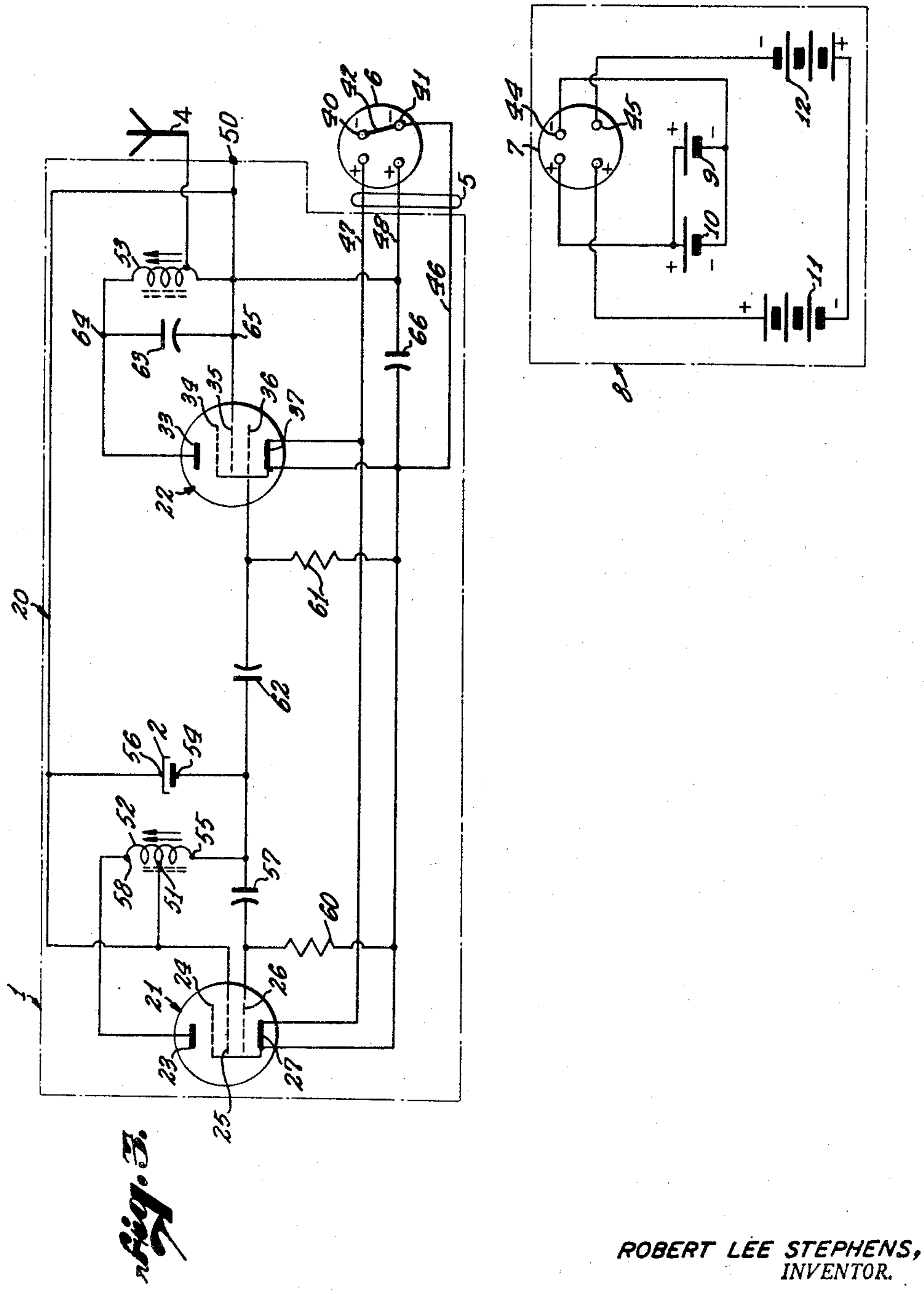
Fig. 3 is a schematic wiring diagram of the circuit for the transmitter and its power supply.

Referring in detail to the drawings, the radio transmitter circuit 20 at the top of Fig. 3 is enclosed in a suitable case 1. At the top of the casing 1 is a condenser microphone 2. The casing 1 has a suitable clip 3, for support on the clothing. The transmitter 20 in the casing 1 has a wire 4 which serves as a ¼ wave antenna and a flexible connection battery cable 5 having a plug 6 for the socket 7 of a casing 8 which houses the filament batteries 9 and 10 in Fig. 3 and the plate batteries 11 and 12. The battery cable 5 and battery in casing 8 act as the ground plane for the antenna 4, and thus the battery cable 5 acts as an additional radiating element.

Figure 1:
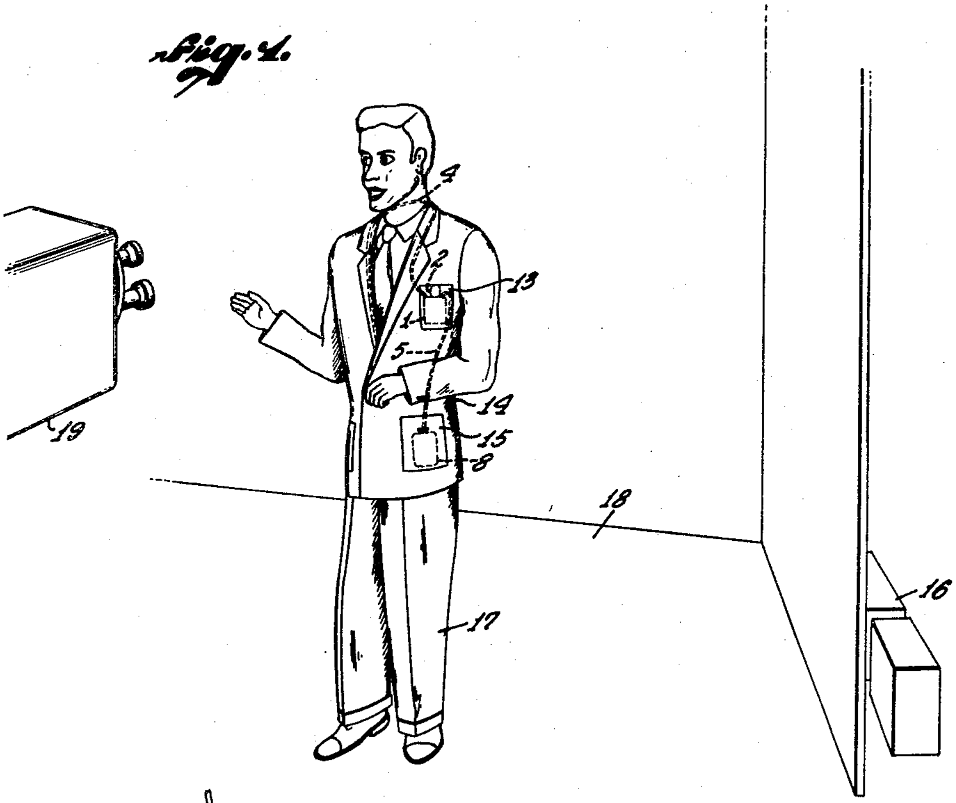
Fig. 1 is a schematic perspective view of a radio link sound pickup according to the present invention.
Figure 2:
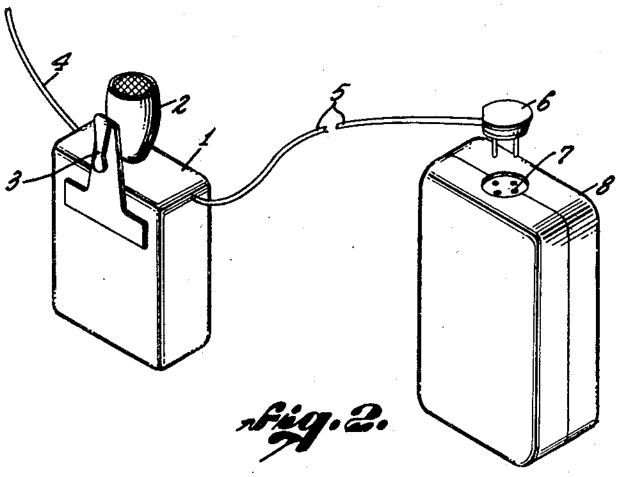
Fig. 2 is an enlarged perspective view of the transmitter and its battery casing, shown half size.

The transmitter casing 1 and its power supply casing 8 are illustrated in Fig. 2 as half size of an actual construction. These elements therefore may be readily concealed in the clothing of an actor. This is illustrated in Fig. 1 where the actor 17 performs on a suitable stage 18 before a camera 19. As above explained, camera 19 may be a motion picture camera or a television camera. The transmitter casing 1 is of a size to fit in the upper pocket 13 of the coat 14, with the microphone 2 uppermost and exposed to receive sound waves emitted by the actor. The battery casing 8 may be arranged in a lower pocket of the coat as indicated at 15. The antenna 4 hangs at the side and is draped around the neck beneath the collar of the coat and it leads to the casing 1 through a hole not shown in the lining of the coat, similar holes being provided for the battery connection 5.

The transmitter 20 in the case 1 emits a frequency modulated radio wave which is picked up by a suitable FM radio receiver 16 which is arranged off stage and out of the field of view of the camera 19.

In the case of an actress, the transmitter case 1 and battery casing 8 may be concealed in a fur neck piece, purse, or otherwise hidden in the clothing, or in gloves, flowers or the like held in the hand.

The transmitter circuit in the case 1 is indicated at 20 in Fig. 3 and employs two sub-miniature pentodes 21 and 22. Tube 21 is an oscillator tube and tube 22 is a frequency doubler.

Tube 21 has a plate or anode 23, suppressor grid 24, screen grid 25, control grid 26 and cathode 27. The corresponding electrodes in tube 22 are indicated at 33 to 37 inclusive, the tubes 21 and 22 being alike. The cathodes 27 and 37 are directly heated filaments.

In the plug 6, the terminals 40 and 41 are connected together by the lead 42 so that when the plug 6 is inserted in the jack 7 with terminal 40, registering with socket terminal 44, also with terminal 43 registering with socket terminal 45, the negative terminals of the cathode batteries and of the plate batteries are connected together and to the line 46. The batteries 9 and 10 may be connected in parallel as shown and may have a voltage of 1.5, while the batteries 11 and 12 are in series to give a voltage of 60. When plug 6 and jack 7 are connected together, the line 47 leads to the positive side of the cathode batteries 9 and 10 and the line 48 leads to the positive side of the plate batteries 11 and 12.

The cathodes 27 and 37 are connected in parallel across the line 46 and 47.

The positive side of the plate battery 11 and 12 is connected to ground as indicated at 50. This ground connection may be the metal case 1, or a frame in case 1. The positive terminal 48 is grounded to casing 1 as shown at 50 in Fig. 3 so that the transmitting antenna 4 and the microphone 2 will be at the potential of casing 1. Also, connecting the antenna 4 to the casing 1 increases the radiating effectiveness of the antenna. The cathodes 27 and 37 are connected by line 46 to the negative side of the plate batteries 11 and 12, while plate 23 is connected through tap 51 of tank coil 52 to ground 50, and plate 33 is connected through coil 53 to ground 50, that is to the positive side of the plate batteries 11 and 12.

Condenser microphone 2 has one terminal 54 connected to one terminal 55 of coil 52 and the other terminal 56 of condenser microphone 2 is connected to ground 50. Coil 52 is the oscillator tank coil. Microphone 2 is connected across the grid portion of this coil; therefore, the frequency of oscillation of tube 21 is determined jointly by the capacity of microphone 2 and coil 52. The terminal 55 is connected through a D. C. blocking condenser 57 to the control grid 26 and the other terminal 58 of tank coil 52 is connected to the plate 23. A grid return path for tube 21 is provided by resistor 60. Bias for tube 21 is developed across resistor 60 by virtue of rectified grid current. A resistor 61 functions similarly in the grid circuit of tube 22. D. C. blocking condensers 57 and 62 isolate the bias voltages developed on grids 26 and 36 from each other and from ground.

The tank circuit of the tube 22 includes the tank coil 53 and in shunt thereto a condenser 63. One common terminal 64 of condenser 63 and coil 53 is connected to plate 33 while the other common terminal 65 is connected to ground 50, that is to the positive side of the plate battery, and is connected through a high frequency by-pass condenser 66 to the cathode 37.

Screen grids 25 and 35 in tubes 21 and 22 respectively are connected to ground 50 and are connected to the cathodes 27 and 37 through by-pass condenser 66. The single condenser 66 serves as a high-frequency by-pass for both plate tank and screen circuits of tubes 21 and 22.

The coils 52 and 53 are both adjustable and each of them has an iron dust core, conducive to high inductance with small coil size.

In the operation of the transmitter, the receiver 16 is tuned to the transmitter 20. Receiver 16 may have an automatic frequency control. The transmitter 20 is energized by inserting plug 6 in socket 7. If a new battery, as is commercially available for small portable radio sets, is used as a power supply about 15 to 20 hours of performance can be obtained, while a small hearing aid pack will operate for 1 or 2 hours. The casing 8 can be opened in any suitable manner to replace the battery.

Variations in the sound pressure received by condenser microphone 2 produce changes in the oscillator frequency at a rate equal to that of the frequency of the sound source. Stray capacities are reduced to a minimum. The condenser microphone 2 is substantially the only capacity in the tank circuit of the oscillator whereby changes in the capacity of the condenser microphone 2, when sound waves are received by it, produce a major influence in the frequency generated by the oscillator.

The tank circuit 53, 63 operates at the second harmonic of the oscillator frequency, whereby the deviation produced in the oscillator is multiplied by a factor of 2. Deviation produced in a sound field of 10 dynes/cm.$^2$ is approximately + or −3 kc. As the harmonic generator or frequency doubler 22 is unilaterally conductive and is arranged between the antenna and the oscillator 21, the harmonic generator 22 reduces the loading of the antenna on the oscilator 21 and thus reduces unwanted frequency shift of the carrier frequency, resulting in more stable operation of the complete system including the receiver 16.

The following are examples of values which may be used for the various elements. Resistor 60 is 50,000 ohms. Resistor 61 is 1 megohm. Resistors are rated at ½ watt. Condensers 57 and 62 are each 100 mmf. Condenser 63 is 10 mmf. Condenser 66 is 10,000 mmf. Condensers are rated at 400 volts. Coil 52 consists of 24 turns of #31 plain enameled copper wire wound on a form ¼ inch in diameter tapped 11 turns from the plate end. Coil 53 consists of 8½ turns of #24 plain enameled copper wire wound on a form ¼ inch in diameter tapped for the antenna connection at 1 turn from the ground end.

Tubes 21, 22 are type 5672 and have a small capacity in relation to the condenser microphone 2.

Stray capacities are kept to a minimum by the use of short leads spaced well away from the case, supporting members, and from each other.

While other values may be used, the capacity of microphone 2 may be 14 mmf. which provides a satisfactory LC ratio in the vicinity of 25 mc. p. s., the frequency of oscillator tube 21.

Tests have shown that this radio system produces essentially flat response from 20 to 15,000 C. P. S., is almost non-directional in character and has under the best conditions a signal-to-noise ratio of about 57 db within a radius of 100 feet from the receiving antenna.

The radio link apparatus of this invention is also useful for espionage by detectives, and members of the Police Dept., Fire Dept., FBI, and the like. The invention may also be used by commentator's assistant at the side line of a football field or other sporting event to relay information to the Press Box.

The invention has the particular advantage that the power of the transmitter is so low that a license is not required from the FCC.

The combined transmitter and receiver disclosed herein is disclosed and claimed in application Ser. No. 262,824, filed Dcember 21, 1951, for Radio Link Sound Pickup, of which the present application is a division.

Various modifications may be made in the invention without departing from the spirit of the following claims.

I claim:

1. A radio transmitter comprising an oscillator having a pentode having cathode, anode, suppressor grid, screen grid and control grid electrodes, a tank coil in circuit between said control grid and said anode, and a condenser microphone directly connected across a portion of said tank coil, said microphone having one terminal connected to said control grid and having another terminal connected to an intermediate portion of said tank coil and to said screen grid.

2. A radio transmitter according to claim 1, a harmonic generator pentode having a control grid and having an output tank circuit tuned to a harmonic of the frequency generated by said oscillator, and a condenser coupling between said control grid terminal of both said tank coil and microphone and the control grid of said harmonic generator, said harmonic generator pentode having a screen grid, said tank circuit of said harmonic generator having a terminal connected to said screen grid of said harmonic generator pentode and to said other terminal of said microphone.

3. A radio transmitter comprising an oscillator having a pentode and a harmonic generator therefor having a pentode, each of said pentodes having cathode, anode, screen grid and control grid electrodes, said oscillator having a tank circuit comprising a condenser microphone and tank coil, said tank coil and microphone having a first terminal having a condenser coupling with said oscillator control grid and having another condenser coupling with said harmonic generator control grid, a circuit connecting an end portion of said tank coil to said oscillator anode, a second terminal connected to said oscillator screen grid and connecting the other terminal of said microphone and an intermediate portion of said tank coil, said harmonic generator having a tank coil and shunt condenser having a third terminal connected to said harmonic generator anode and having a fourth terminal connected to said harmonic generator screen grid, a battery supply having positive and negative terminals, a connection from said positive terminal to said second and fourth terminals, a connection from said negative terminal to both of said cathodes and a high frequency by-pass condenser connected across said fourth terminal and both of said cathodes.

4. An oscillator comprising a pentode having cathode, anode, screen grid and control grid electrodes, a tank coil having one terminal in circuit with said anode, said coil having another terminal having a condenser coupling with said control grid, a condenser microphone having one terminal in circuit with said control grid terminal of said coil, said microphone having another terminal in circuit with screen grid and with an intermediate portion of said tank coil, a direct current power supply having positive and negative terminals, a circuit connecting said intermediate coil terminal to said positive terminal, a circuit connecting said negative terminal to said cathode, an alternating current output circuit between said control grid and said cathode, and a high frequency by-pass condenser across said positive and negative terminal circuits.

5. A radio transmitter comprising an oscillator having a pentode and a harmonic generator therefor having a pentode, each of said pentodes having cathode, anode, screen grid and control electrodes, said oscillator having a tank circuit comprising a tank coil and condenser microphone, said microphone and an intermediate portion of said coil having a terminal connection with the screen grid of said oscillator pentode, said harmonic generator having a tank circuit comprising a tank coil and a condenser having a terminal connection with the screen grid of said harmonic generator, a direct current power supply having positive and negative terminals, circuits connecting said screen grid tank terminals of both said oscillator and said harmonic generator to said positive terminal, a connection from said negative terminal to said cathodes, a high frequency by-pass condenser across said positive and negative terminal circuits, a metal casing for said oscillator and harmonic generator and a ground connection between said casing and said positive terminal circuit.

6. A radio transmitter comprising an oscillator and a harmonic generator therefor, each having a pentode having a cathode, anode, screen grid and control electrodes, said oscillator having a tank circuit comprising a tank coil and condenser microphone, said tank circuit having a terminal having circuit connections with both of said control electrodes, said tank circuit having another terminal connection with said screen grid of said oscillator pentode, said harmonic generator having a tank circuit comprising a tank coil and having a terminal connection with the screen grid of said harmonic generator pentode, a direct current power supply having positive and negative terminals, a circuit for said positive terminal providing a direct current path through the coil of each of said tank circuits to their respective anodes, a circuit connecting said negative terminal to said cathodes and a high frequency by-pass condenser in the screen grid tank terminal-cathode circuit of both of said pentodes and connected across said positive and negative terminal circuits.

7. Radio link apparatus comprising a pocket-size casing containing an oscillator and a harmonic generator therefor having input and output circuits, an antenna circuit for said output and including an antenna adapted to be concealed in the clothing of a wearer and free from a ground conductor, another pocket-size casing containing a battery supply, a cable adapted to be concealed in said clothing for connecting said battery supply to said circuits in said first casing, said battery supply having a positive terminal and said cable having a positive conductor therefor, said oscillator having a tank circuit and a condenser microphone of small size and adapted to be concealed in said clothing, a connection in said first casing between said positive conductor and said antenna, whereby said battery cable acts as a supplementary radiator, connections in said first casing between said positive conductor and said antenna and said microphone whereby said antenna and said microphone are at the potential of said first casing, said first casing having circuits connecting said microphone across said tank circuit and to said input of said harmonic generator.

References Cited in the file of this patent

UNITED STATES PATENTS

| | | |
|---|---|---|
| 1,977,439 | Hammond, Jr. | Oct. 16, 1934 |
| 2,130,206 | Tittle | Sept. 13, 1938 |
| 2,162,806 | Fay | June 20, 1939 |
| 2,311,491 | Turner | Feb. 16, 1943 |
| 2,321,370 | Dubilier | June 8, 1943 |
| 2,329,069 | Markowitz | Sept. 7, 1943 |